United States Patent
Glasberg et al.

(10) Patent No.: US 7,761,491 B2
(45) Date of Patent: Jul. 20, 2010

(54) METHOD FOR DETECTING A COMMERCIAL IN A VIDEO DATA STREAM BY EVALUATING DESCRIPTOR INFORMATION

(75) Inventors: Ronald Glasberg, Knesebeckstrasse 98a, Berlin (DE) 10623; Thomas Sikora, Apostel-Paulus-Strasse 32, Berlin (DE) 10823; Cengiz Tas, Berlin (DE)

(73) Assignees: EcoDisc Technology AG, Zurich (CH); Thomas Sikora, Berlin (DE); Ronald Glasberg, Berlin (DE)

( * ) Notice: Subject to any disclaimer, the term of this patent is extended or adjusted under 35 U.S.C. 154(b) by 984 days.

(21) Appl. No.: 11/406,044

(22) Filed: Apr. 18, 2006

(65) Prior Publication Data
US 2007/0261075 A1    Nov. 8, 2007

(51) Int. Cl.
G06F 17/30    (2006.01)
G06F 12/00    (2006.01)
(52) U.S. Cl. ..................... 707/913; 707/754
(58) Field of Classification Search ............. 707/104.1, 707/102, 101
See application file for complete search history.

(56) References Cited

U.S. PATENT DOCUMENTS

| | | | | |
|---|---|---|---|---|
| 6,005,603 | A * | 12/1999 | Flavin | 725/32 |
| 6,870,956 | B2 * | 3/2005 | Qi et al. | 382/170 |
| 2003/0001977 | A1 * | 1/2003 | Wang | 348/700 |
| 2003/0033347 | A1 | 2/2003 | Bolle et al. | |
| 2003/0039465 | A1 * | 2/2003 | Bjorgan et al. | 386/20 |
| 2004/0161154 | A1 * | 8/2004 | Hua et al. | 382/229 |
| 2005/0078222 | A1 | 4/2005 | Liu et al. | |

FOREIGN PATENT DOCUMENTS

WO    0213067 A2    4/2010

OTHER PUBLICATIONS

Thomas Hargrove: Logo Detection in Digital Video, Math 100, Mar. 6, 2001.*
Brandon Satterwhite et al, "Automatic Detection of TV Commercials", IEEE Potentials, Apr./May 2004, pp. 9-12.
Rainer Llenhart et al, "On The Detection and Recognition of Television Commercials", International Conference on Multimedia Computing and Systems, 1997, pp. 509-516.
David A Sadlier et al, "Automatic TV Advertisement Detection from MPEG Bitstream", International Conference on Enterprise Information Systems, 2001, pp. 449-452.
Richard J. M. den Hollander et al, "Logo Recognition in Video Stills by String Matching", International Conference on Image Processing, 2003, pp. 517-520.
J.R. Quinlan, "Decision Trees and Decisionmaking", IEEE Transactions on Systems, Man and Cybernetics, Mar./Apr. 1990, pp. 339-346.
International Search Report dated Aug. 06, 2007 for PCT/EP2007/003409.
Written Opinion of the International Searching Authority for PCT/EP2007/003409.

(Continued)

Primary Examiner—Kuen S Lu
(74) Attorney, Agent, or Firm—Sutherland Asbill & Brennan LLP (57) ABSTRACT

Systems, methods, and devices for detecting a commercial in a video data stream by evaluating descriptor information provided from a plurality of visual descriptors indicative of commercial or non-commercial features. The descriptor information provided from the plurality of descriptors may be evaluated in an entropy based decision process.

8 Claims, 8 Drawing Sheets

OTHER PUBLICATIONS

Albiol, k, et al., "Detection of TV Commercials," Acoustics, Speech, and Signal Processing. Proceedings. (ICASSP 2004).

Yuan, Ye, et al., "Automatic Video Classification using Decision Tree Method," Proceedings of the First International Conference on Machine Learning and Cybernetics. (Nov. 2002).

Truong, B., et al., "Automatic Genre Identification for Content-based video Categorization," 15th International Conference, Pattern Recognition Proceedings (Sep. 2000).

Lienhart, L., et al., "On the Detection and Recognition of Television Commercials," Proceedings of the Internaitonal Conference on Multimedia Computing and Systems (Jun. 1997).

Sadlier, D., et al., "Automatic TV Advertisement detection from MPEG Bitstream," The Journal of the Pattern Recognition Society (Dec. 2002).

International Report on Patentability for PCT/EP2007/003409.

* cited by examiner

METHOD FOR DETECTING A COMMERCIAL IN A VIDEO DATA STREAM BY EVALUATING DESCRIPTOR INFORMATION

The invention relates to a method for detecting a commercial in a video data stream by evaluating descriptor information provided from a plurality of descriptors indicative of commercial or non-commercial features.

BACKGROUND OF THE INVENTION

With the advent of digital TV-broadcasts and video libraries presenting more than hundred of channels at a time over Antenna, Cable, Internet and Satellite, the need for a user-friendly TV-program selection is growing. Unlike the present TV and Internet, a new system should enable users to access programs clustered by genres.

There are several approaches addressing commercial-detection and video-classification. Satterwhite et al. (IEEE Potentials, pp. 9-12, 2004) describe the characteristics of commercials and give an overview of several algorithms, which have been experimentally used for detection. Usually so-called descriptor information is evaluated for detecting commercials in a video data stream. A descriptor can be considered as a filter extracting indicative parameter. A descriptor can extract commercial specific features from a video data stream.

A known descriptor refers to the appearance of several monochrome black frames also referred to as separating frames or dark frames between each commercial block. In this context Lienhart et al. published an approach (R. Lienhart et al., IEEE Conference on Multimedia Computing and Systems, pp. 509-516, 1997), requiring that the average and the standard deviation intensity values of the pixels in these frames should be below a certain threshold. Sadlier et al. (International Conference on Enterprise Information Systems, pp. 449-452, 2001) designed a method to detect black frames using the DC-coefficients in an MPEG-1-encoded bit stream.

Information on the removal of the TV-logo (network logo) during the commercial blocks is another descriptor. The recognition of logos, for example, is described in R. J. M. den Hollander et al. (International Conference on Image Processing, volume 3, pp. 517-520, 2003). These methods are computationally expensive and therefore not suitable for our real-time application.

SUMMARY OF THE INVENTION

It is the object of the invention to provide techniques for detecting a commercial in a video data stream by evaluating descriptor information provided from a plurality of descriptors indicative of commercial or non-commercial features, where the commercials are detected with higher likelihood.

According to one aspect of the invention a method for detecting a commercial in a video data stream by evaluating descriptor information provided from a plurality of descriptors indicative of commercial or non-commercial features, the method comprising the steps of: detecting a plurality of video data frames in the video data stream; analyzing for each video data frame of the plurality of video data frames sub-areas where an essentially static logo is likely to be broadcasted; generating from the analysis of the sub-areas static area descriptor information; and using the static area descriptor information in the step of evaluating the descriptor information.

According to another aspect of the invention a method for detecting a commercial in a video data stream by evaluating descriptor information provided from a plurality of descriptors indicative of commercial or non-commercial features, the method comprising the steps of: detecting a plurality of video data frames in the video data stream; deciding for each video data frame whether the video data frame is a separating frame by analyzing for each video data frame a plurality of sub-images; generating separating block descriptor information; and using the separating block descriptor information in the step of evaluating the descriptor information.

According to still another aspect of the invention a method for detecting a commercial in a video data stream by evaluating descriptor information provided from a plurality of descriptors indicative of commercial or non-commercial features, wherein the descriptor information provided for the plurality of descriptors is evaluated in an entropy based decision process.

The invention provides the advantage that detection of commercials in a video data stream is faster and more reliable. The techniques provided are especially suitable for real-time application.

Static area descriptor information is provided from a fast descriptor which detects the presence of a transparent or non-transparent static logo by detecting sub-areas instead of recognizing logos. The recognition is computationally expensive and, therefore, not suitable for real-time application. The separating block descriptor information prevents false acceptance of dark frames as separating frame, so that a very high detection accuracy of separating blocks is achieved. In the entropy based process the descriptor information is logically combined with a simple classifier to produce a reliable commercial detection—instead of using a complex classifier.

Preferably, the step of analyzing the sub-areas comprises a step of analyzing sub-areas located in corner sections of the video data frames.

In another preferred embodiment, the step of analyzing the sub-areas further comprises steps of: generating for each video data frame of the plurality of video data frames values of luminance for each of the sub-areas; storing a plurality of darkest values of luminance for each of the sub-areas; generating for each of the sub-areas an average value of luminance; and generating the static area descriptor information as indicative of the commercial if for at least one of the sub-areas the average value of luminance exceeds a threshold value.

The following advantageous embodiments may be provided where separating block descriptor information is evaluated.

In a preferred embodiment, the method further comprises the steps of: deciding for each video data frame whether the video data frame is a separating frame by analyzing for each video data frame a plurality of sub-images; generating separating block descriptor information; and using the separating block descriptor information in the step of evaluating the descriptor information.

In a refinement of the invention, the step of analyzing the plurality of sub-images further comprises steps of: generating for each of the sub-images an average value of luminance; and comparing for each of the sub-images the average value of luminance to a threshold value of luminance.

In a preferred embodiment, the step of analyzing the plurality of sub-images further comprises steps of: generating for each of the sub-images a value of variance; and comparing for each of the sub-images the value of variance to a threshold value of variance.

In a further preferred embodiment, the step of analyzing the plurality of sub-images further comprises steps of: detecting a number of consecutive separating frames; and comparing the detected number of consecutive separating frames to a pre-defined number of consecutive separating frames. Preferably, the step of analyzing the plurality of sub-images further comprises steps of: detecting a separating block of separating frames; and detecting a time distance of the detected separating block to a previous separating block of separating frames.

In a preferred embodiment, the entropy based decision process uses an ID3 algorithm. Combining the descriptor information logically with a simple classifier—instead of a complex classifier—to produce a reliable commercial detection.

DESCRIPTION OF PREFERRED
EMBODIMENTS OF THE INVENTION

Following the invention will be described in further detail, by way of example, with reference to different embodiments. In the figures.

Referring to FIG. 1 to 9, a method for detecting a commercial in a video data stream by evaluating descriptor information provided from a plurality of descriptors indicative of commercial or non-commercial features is described. The video data can be compressed.

Figure 1:
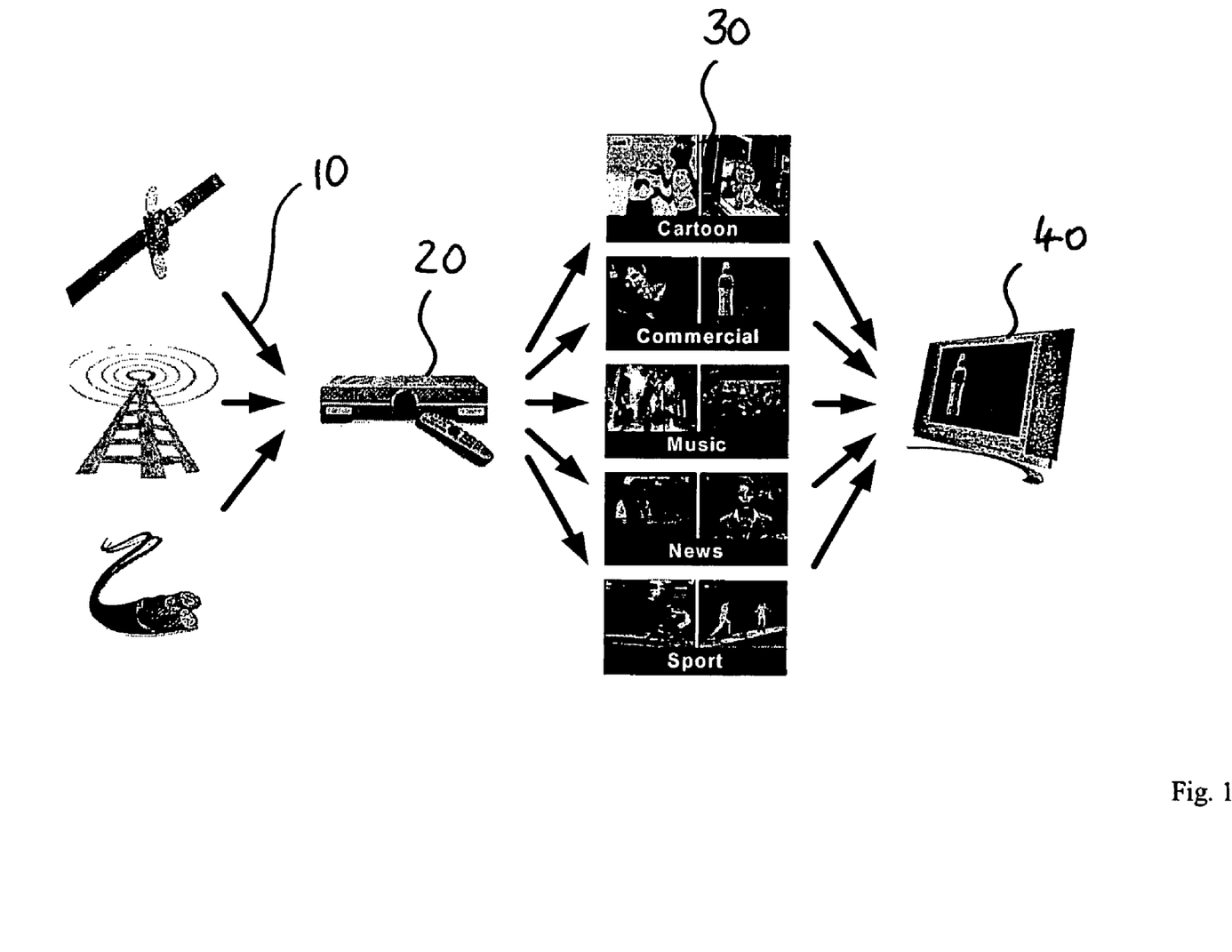
FIG. 1 shows schematically a concept of a video-genre-classification system.

FIG. 1 shows schematically a concept of a video-genre-classification system. Input to the system is a video data stream 10 received, for example, by a device 20 over an antenna, cable, internet, satellite or a DVD player. In a feature extraction and classification stage 30, descriptors analyze video data frames, extract features and combine them with a classifier to a genre. Therefore the new system enables users to access programs shown on a user device 40 to be clustered by genres.

Figure 2:
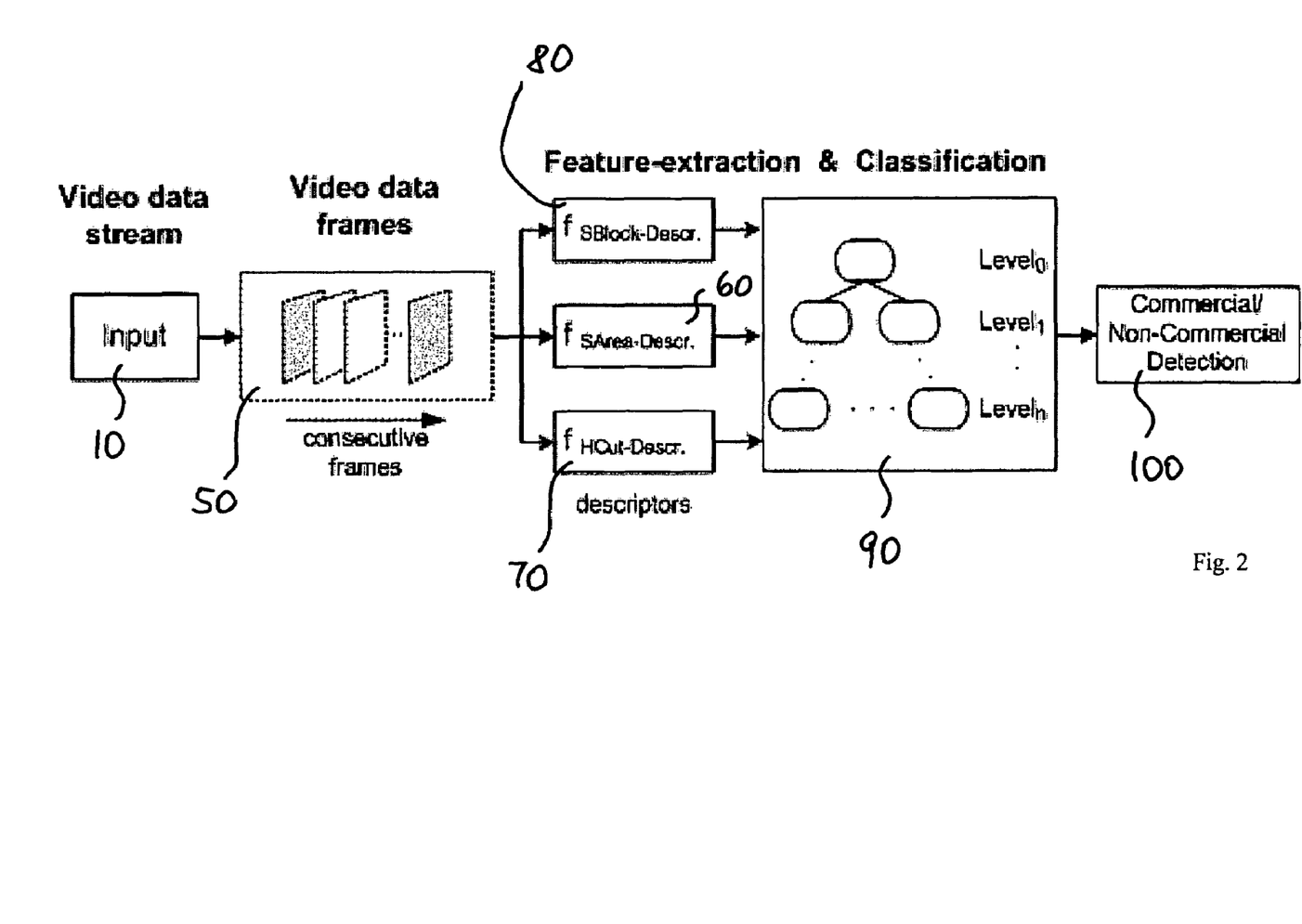
FIG. 2 shows schematically a representation of a method for detecting a commercial in a video data stream by evaluating descriptor information provided from a plurality of descriptors indicative of commercial or non-commercial features.

In an overview FIG. 2 shows schematically a representation of a method for detecting a commercial in the video data stream 10 by evaluating descriptor information provided from a plurality of descriptors indicative of commercial or non-commercial features. Extracted information from different visual descriptors, namely a static area descriptor 60, a separating block descriptor 80, and hard-cut-rate descriptor 70, of consecutive video data frames 50 are logically combined using a decision tree based evaluation 90 to produce a reliable recognition 100. Although optimized results are provided by evaluating descriptor information from several descriptors, compared to the prior art, improved commercial detection is also achieved by using at least one of the newly proposed evaluation features.

Figure 3:
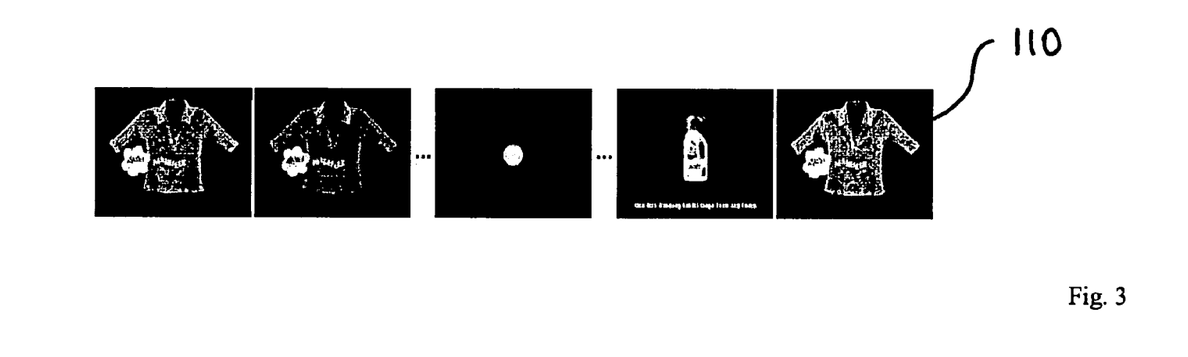
FIG. 3 shows a plurality of candidate video data frames for false acceptance as a separating block being part of a fade.

FIG. 3 shows a plurality of candidate video data frames 110 for false acceptance as a separating block being part of a fade. With the descriptor, which examines sub-images of each video data frame, the number of consecutive dark frames and the time-distance to previous separating blocks, the false acceptance of the presented dark frame as a separating block is prevented.

Figure 4:
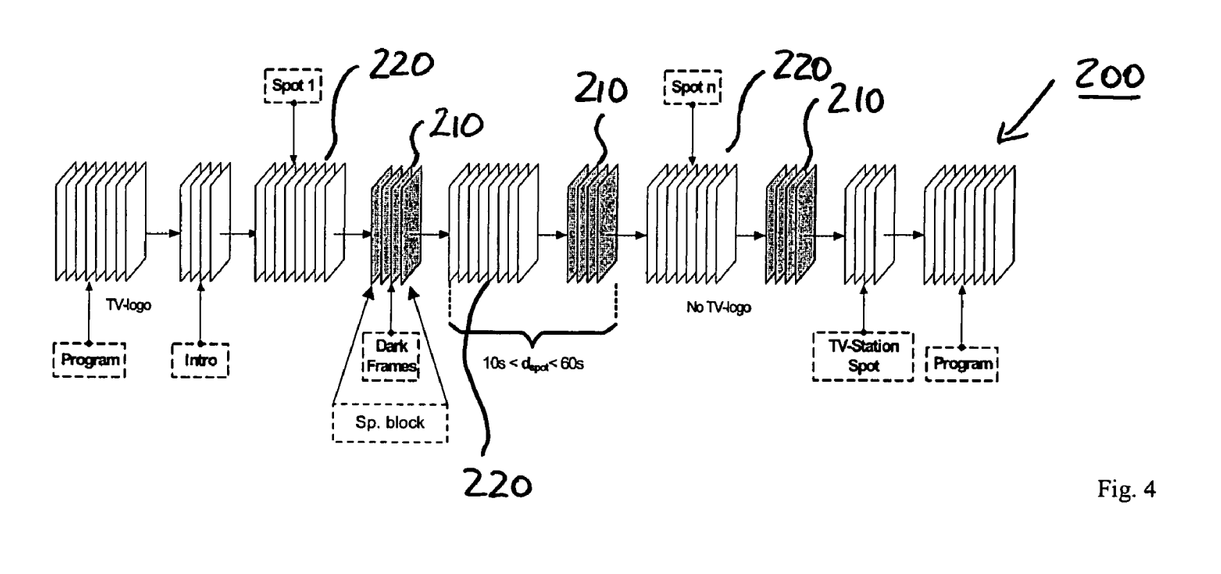
FIG. 4 shows schematically a representation of a structure of video data frames of a commercial.

Commercials for TV have several characteristic features in common. FIG. 4 shows schematically a representation of video data frames of a commercial 200. The following features are depicted:

(a) appearance of 3 to 14 separating video data frames 210 between (black frames) each commercial block 220, (b) duration of individual commercials more than 10 seconds and less than 60 seconds, (c) removal of the TV-logo during the commercial breaks, and (d) high number of hard-cuts within the commercials.

Based on these observations, three descriptors are proposed to transform the video data into feature vectors. In a first step all consecutive video data frames of the video data stream are saved temporarily for processing. Following descriptor information is generated for a plurality of descriptors.

Figure 5:
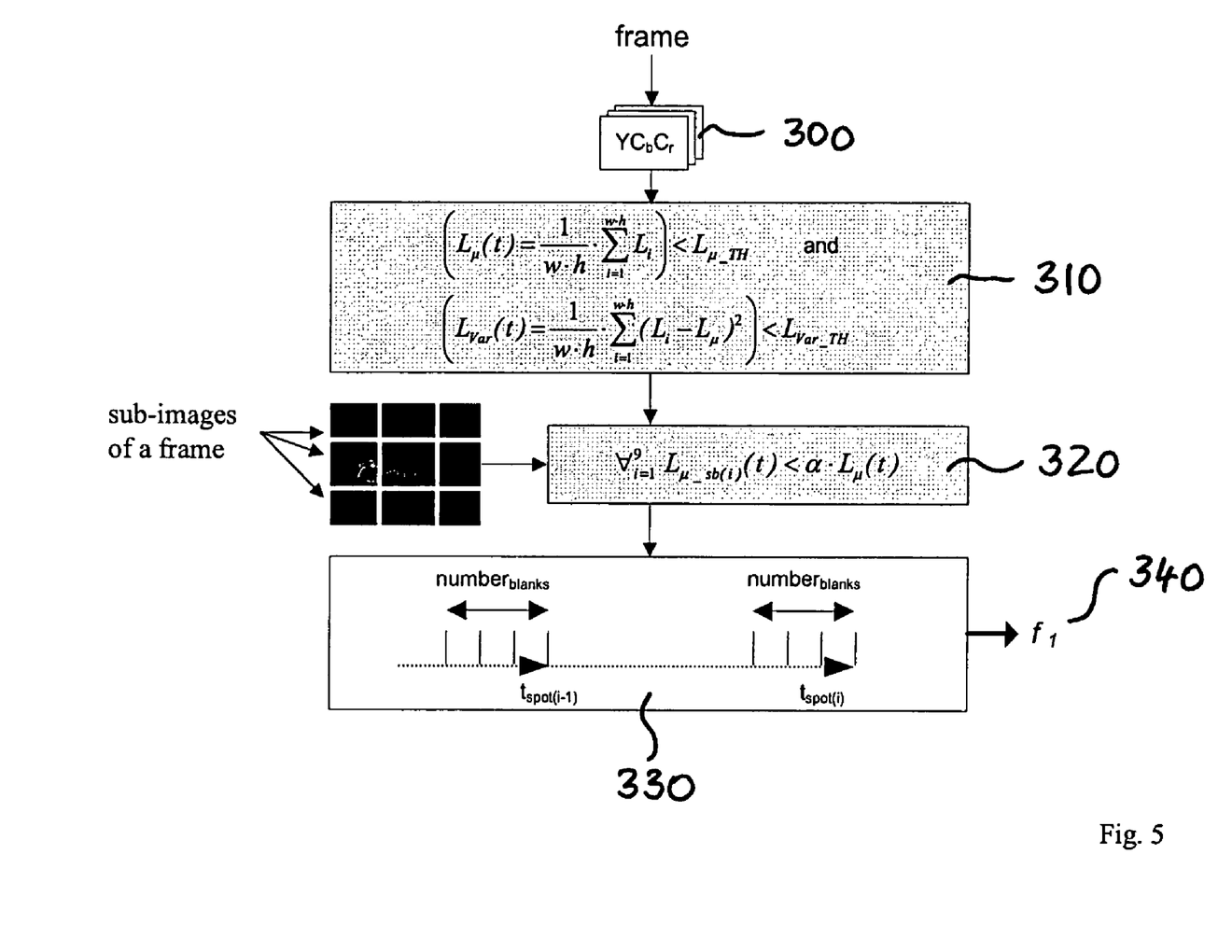
FIG. 5 shows schematically a block diagram representation of a process of generating separating block descriptor information.

Referring to FIG. 5, a process of generating separating block descriptor information is described. In the present embodiment, the following steps are performed:

1) A color transformation to receive the luminance information by taking each consecutive video data frame and transforming it in a color space, where the luminance signal Y is directly available (e.g. YCBCR) 300.

2) An average value of luminance and a variance value of luminance are generated for each video data frame by determine the average luminance $L_\mu$ as well as the variance $L_{var}$ of the pixels for each consecutive video data frame 310. All candidates as separating frames have to be below a certain threshold.

3) A value of average luminance $L_{\mu\text{-}sb}$ for 3×3 sub-images of the video data frames is provided 320. Next, for the candidates as a dark frame the average luminance $L_{\mu\text{-}sb}$ for 3×3 sub-images of the selected frame is examined. If the 3×3=9 average luminance values are below a threshold, the video data frame is declared as a separating frame (black frame or dark frame).

4) The number of consecutive separating frames is counted. The number of consecutive separating frames, satisfying the requirements mentioned in step 3), is counted and has to be in a certain range (appearance of 3 to 14 separating frames between each commercial) 330.

5) The time distance to previous blocks of separating frames is considered. This is called a separating block f1, if the time distance to the previous separating block fulfills the restrictions (duration of individual commercials more than 10 and less than 60 seconds) regarding the duration of individual commercials 340.

Compared to the prior art, the present method prevents false acceptance of separating frames also referred to black or dark frames belonging to fades within a commercial spot, but still showing a small area of information. The proposed descriptor analyses sub-images of a video data frame and, optionally, the time-distance between separating blocks.

Figure 6:
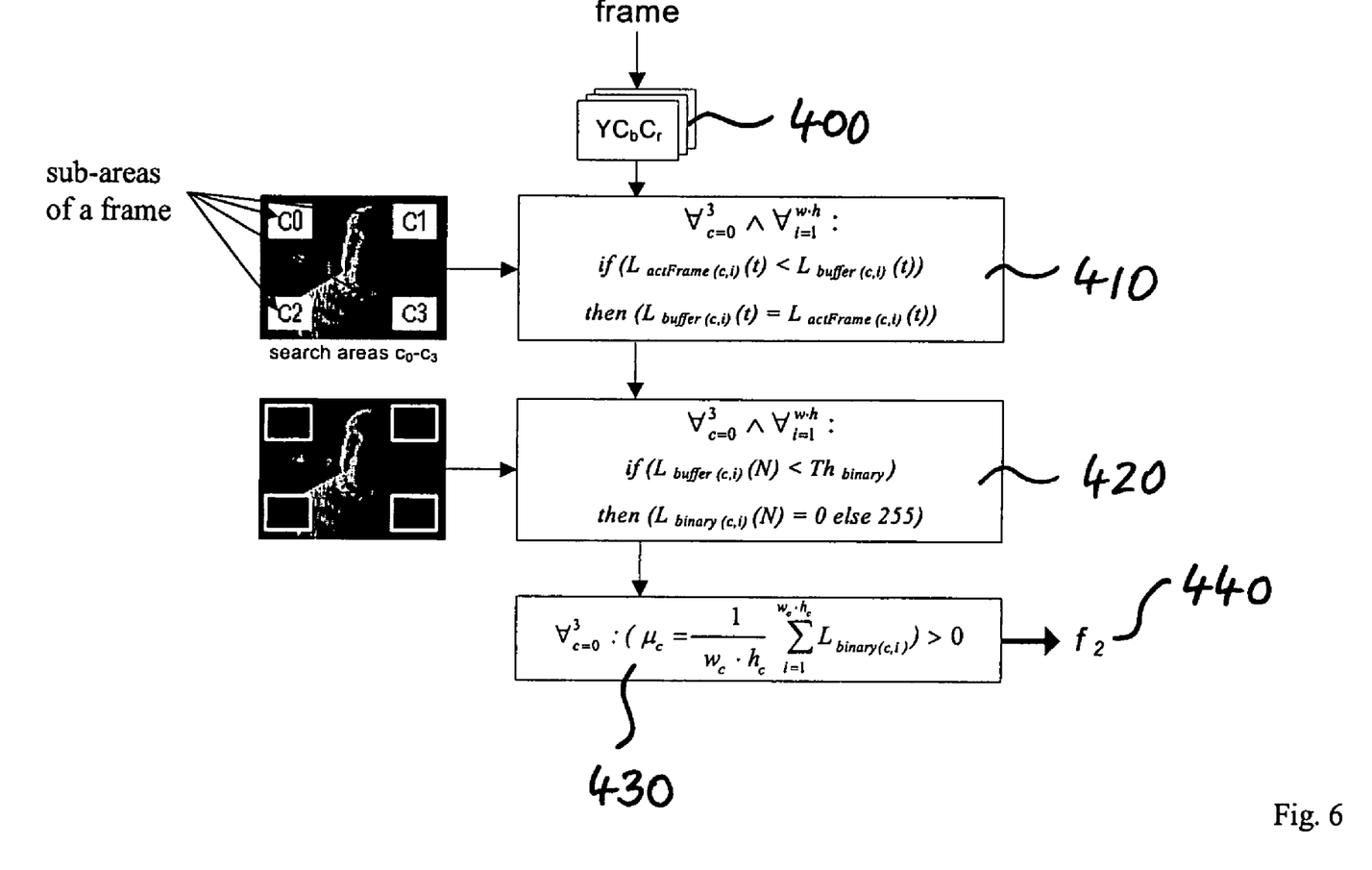
FIG. 6 shows schematically a block diagram representation of a process of generating static area descriptor information.

Referring to FIG. 6, a process of generating static area descriptor information is described. It is investigated whether a TV-logo is present or not. This task was solved by examining, if in the interesting scanned areas, a static field is present. In the present embodiment, the following steps are performed:

10) A color transformation to receive the luminance information by taking each consecutive video data frame and transforming it in a color space, where the luminance signal Y is directly available (e.g. YCBCR) 400.
11) Pixel luminance values in scanned sub-areas c0-c3 of a first examined video data frame are saved. Corresponding luminance values Y of the pixels in the scanned sub-areas c0-c3 of the first video data frame of a processing window N are saved in a buffer $L_{buffer}$.
12) The darkest pixel luminance values are stored. For each consecutive frame, the current values $Lact_{Frame}$ in the scanned sub-areas are compared with $L_{buffer}$ in the scanned sub-areas. The darkest values of the search for each sub-area are stored 410.
13) A binary image is generated. After a length of N video data frames, a binary image is generated by comparing the resulting values to a threshold 420.
14) An average value of luminance for each scanned sub-area is generated. For each of the four scanned sub-areas c0-c3 the average luminance value is calculated separately 430.
15) It is decided whether a static area is present. If the average luminance value μc of at least one of the four sub-areas c0-c3 is higher than zero, static pixels f2 are detected, and the probability of a TV-logo, present in this sub-area, is high 440.

Figure 7:
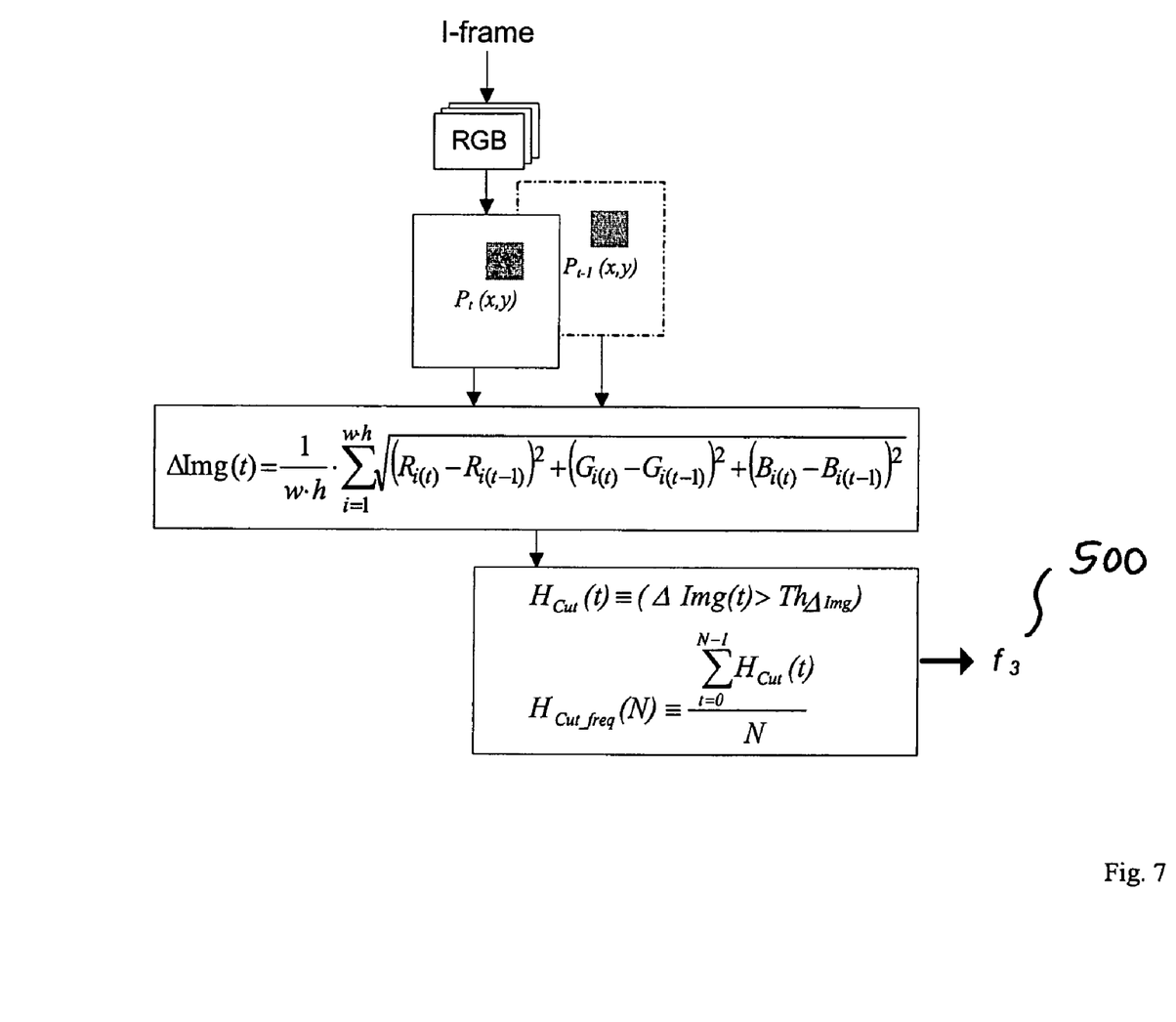
FIG. 7 shows schematically a block diagram representation of a process of generating hard-cut-rate descriptor information.

Referring to FIG. 7, the difference of two consecutive I-frames presents a hard-cut, if this difference exceeds a certain threshold. The amount of these values is averaged over a window N resulting in the hard cut frequency f3 500. Also one descriptor was implemented which builds on the motion-activity information included in the mpeg-2 stream.

Figure 8:
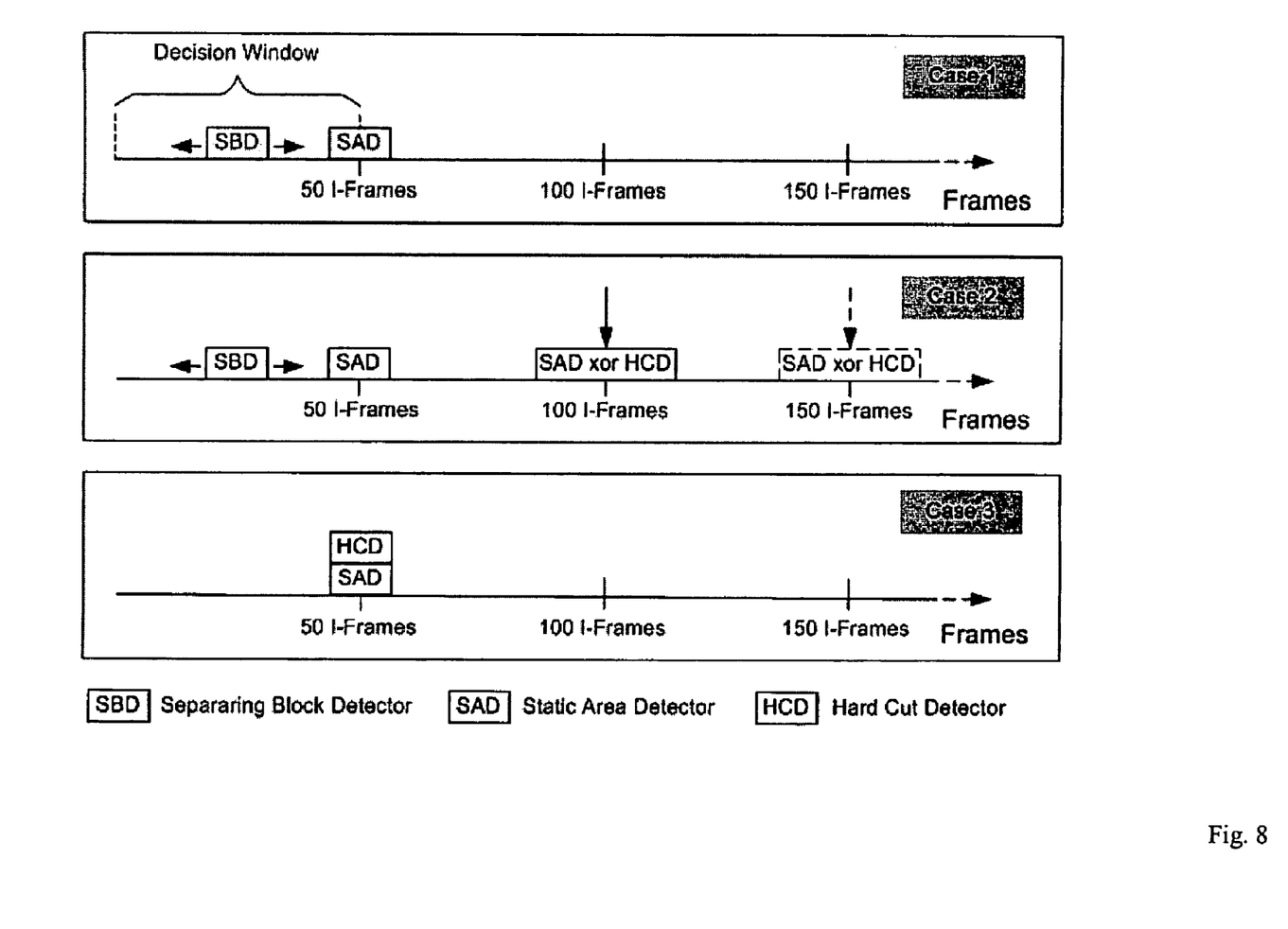
FIG. 8 shows schematically a representation of the appearance of features in a commercial.

Referring to FIG. 8, the descriptors were applied to a set of training video data. The extracted features of the commercial sequences appeared within a decision window of N=50 I-frames mainly in three combinations, namely case 1, case 2, and case 3 according to FIG. 8. In case 1 a separating block and non-static areas (no-logos) were detected within a decision window. In case 2 either a high hard-cut-rate or no-logo was detected providing that case 1 occurred within the last 100 I-frames. In case 3 no-logo and a high hard-cut-frequency were simultaneously detected.

These cases are combined with a decision tree according to the ID3 algorithm which as such is known (see for example J. R. Quinlan, IEEE Transactions on Systems, Man and Cybernetics, volume 20, pp. 339-346, 1990). The average entropy E for each of the cases shown in FIG. 8 is calculated as follows:

$$E_{average} = \sum_{j=1}^{b} \left( \left(\frac{n_b}{n_1}\right) \cdot \left[ \sum_{i=1}^{c} -\left(\frac{n_{bc}}{n_b}\right) \log_2\left(\frac{n_{bc}}{n_b}\right) \right] \right)$$

The results are depicted in Table 1.

TABLE 1

| | Cases with accepted/rejected rate as commercial | | | | | | |
|---|---|---|---|---|---|---|---|
| | Commercial | | | Non-Commercial | | | |
| | correct accept. | false accept. | Σ | false reject. | correct accept. | Σ | |
| case 1 | 82 | 0 | 82 | 16 | 384 | 400 | |
| case 2 | 8 | 0 | 8 | 90 | 348 | 474 | $n_t$ |
| case 3 | 56 | 2 | 58 | 42 | 382 | 424 | |
| | $n_{bc1+}$ | $n_{bc2+}$ | $n_{b+}$ | $n_{bc1-}$ | $n_{bc2-}$ | $n_{b-}$ | |

Figure 9:
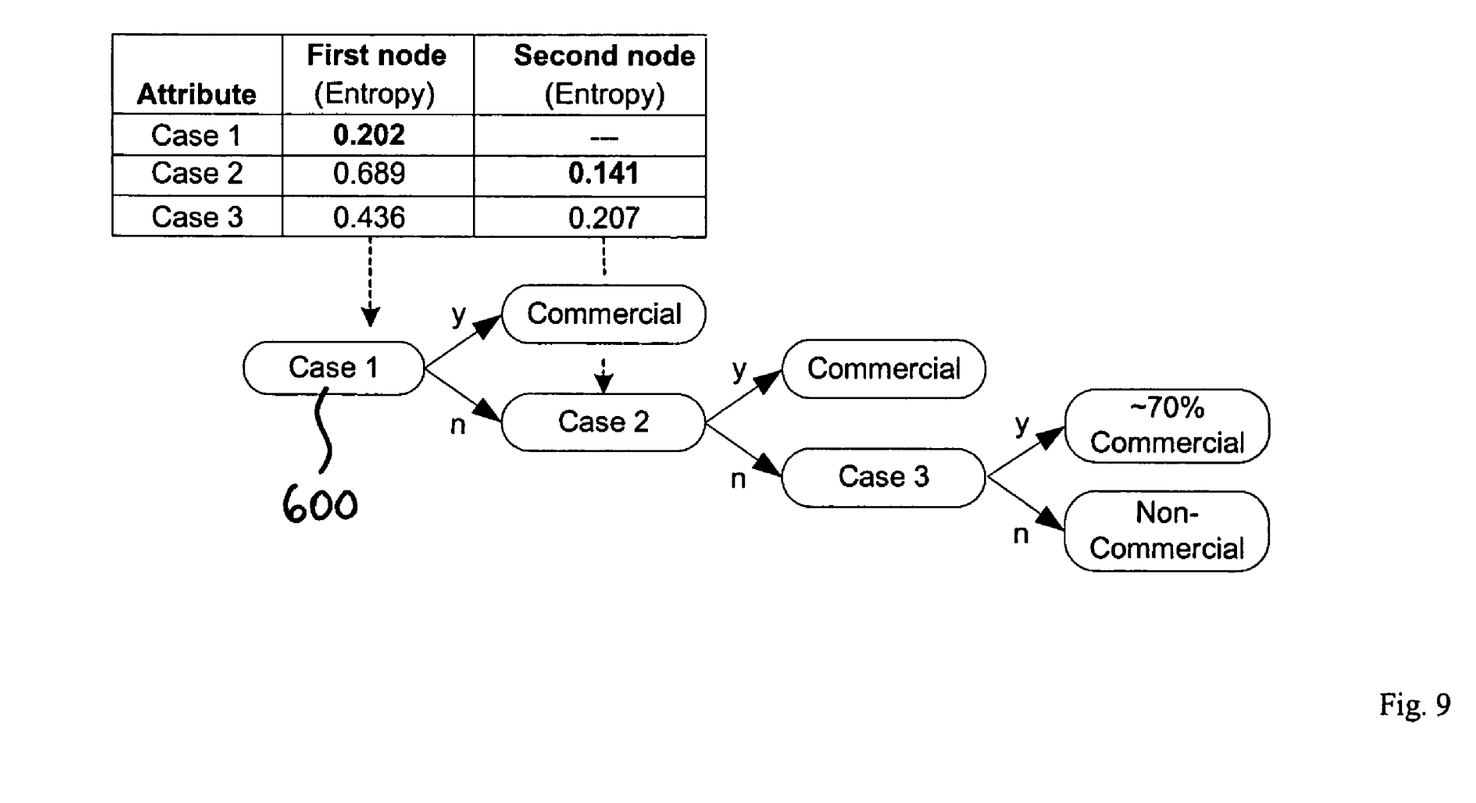
FIG. 9 shows schematically a block diagram representation of a process of evaluating descriptor information in an entropy based decision tree process.

Referring to FIG. 9 and the results in Table 1 above, the case with the lowest entropy forms a first node 600. The resulting decision tree is shown in FIG. 9. The following steps are performed:

(i) First it is examined if case 1 (see FIG. 8) appeared within the decision window of N (50 consecutive I frames). If yes, a commercial has been detected.
(ii) If case 1 didn't appear within N, it was checked whether case 2 (see FIG. 8) appeared within 2*N. If yes, again commercial has been detected.
(iii) If case 1 and case 2 didn't appear, but case 3 appeared commercial has been detected.

Experimental studies were performed on a database of 200 representative video data sequences (100 sequences for training and 100 as testing-data), in total of 400 minutes of recordings; 40 'commercials' and 4*40 'non-commercials' (cartoon, music, news and sport) of 2 minutes' each gathered from popular networks (ARD, BBC, CNN, MTV, VIVA, ZDF). Video data frames were extracted and scaled down for the analysis only to a resolution of 90*72 pixels. The number of considered frames in the processing window is N=50 I-frames.

The performance of each descriptor on the training-data was examined. The separating block descriptor should detect the transition from a running spot to a new spot.

TABLE 2

| Classification accuracy of the separating-block descriptor | | |
|---|---|---|
| Genre | observed number of separating blocks | detected number of separating blocks |
| Commercial | 111 | 108 |
| Cartoon | 0 | 2 |
| Music | 0 | 7 |
| News | 0 | 0 |
| Sports | 0 | 0 |

From 111 subjectively determined separating blocks within the 20 'commercials' only three blocks, including fades, were misclassified. The same reason caused the false acceptances in 'cartoon' and 'music'. In 'news' and 'sports' the descriptor worked correctly.

Table 3 shows the amount of windows N within each genre and the detected number of windows with non-static areas.

TABLE 3

| Classification accuracy of the static-area descriptor | | |
|---|---|---|
| Genre | examined number of windows | detected number of non-static areas/no logo |
| Commercial | 98 | 90 |
| Cartoon | 94 | 0 |

TABLE 3-continued

Classification accuracy of the static-area descriptor

| Genre | examined number of windows | detected number of non-static areas/no logo |
|---|---|---|
| Music | 105 | 1 |
| News | 95 | 1 |
| Sports | 90 | 0 |

From 98 windows in commercial, 90 with non-static-areas were detected. The remaining 8 contained a static 'company-logo'. In 'music' we had a window including a scene-change without the TV-logo and in 'news' the logo was at the beginning on a window outside the scanned corners.

Table 4 shows the performance of the hard-cut-rate descriptor.

TABLE 4

Classification accuracy of the hard-cut-rate descriptor

| Genre | examined number of windows | detected number of windows with high-cut rate |
|---|---|---|
| Commercial | 98 | 59 |
| Cartoon | 94 | 20 |
| Music | 105 | 45 |
| News | 95 | 4 |
| Sports | 90 | 15 |

The recognition of 'commercials' in a processing window using a single descriptor is obviously not sufficient. In order to achieve high identification rates, we developed the tree with nodes based on logical combinations of the descriptors and a branching ratio of 2.

Table 5 shows the detection rates for the 20 video sequences of each genre used in our experiments, there were 100 video data streams for testing.

TABLE 5

Probability for video being detected as Commercial

| Genre | examined number of windows | detected number of commercials | (%) |
|---|---|---|---|
| Commercial | 98 | 91 | 93% |
| Cartoon | 94 | 0 | 0% |
| Music | 105 | 1 | 1% |
| News | 95 | 1 | 1% |
| Sports | 90 | 0 | 0% |

In the experiment 91 from 98 examined windows from the genre 'commercial' were classified as commercial. The remaining 7 windows were very close to the commercial-detection threshold of 50%. Those sequences started within a commercial, after the appearance of a separating block, presented a long spot with a 'company-logo' and had a low high-cut-frequency. It is obvious, that detection of sequences with 'special cases' is highly unreliable. It is interesting to note that only 1 from 105 examined windows of the genre 'music' and 1 of 95 windows of 'news' were misclassified (caused by non-static areas and high cut-rate). The genre 'cartoon' and 'sport' were correctly classified in more than 90 windows.

A new approach for the detection of commercials is presented. Among others, three contributions to optimization of commercial detection in video data streams have been made. New visual descriptors are provided. The temporal relations of the features are evaluated. Finally, a decision tree process is proposed to combine the results of the visual descriptors, deriving a probability rate for a video sequence being a 'commercial' or 'non-commercial'. A video database containing five popular genres namely cartoon, commercial, music, news and sports has been used. An average correct classification rate of 93% for commercial-videos detected as a 'commercial' and more than 99% for the other genres detected as a 'non-commercial' has been achieved.

The features disclosed in this specification, claims and/or the figures may be material for the realization of the invention in its various embodiments, taken in isolation or in various combinations thereof.

The invention claimed is:

1. A method for detecting a commercial in a video data stream by evaluating descriptor information provided from a plurality of descriptors indicative of commercial or non-commercial features, the method comprising the steps of:

detecting a plurality of video data frames in the video data stream;

analyzing for each video data frame of the plurality of video data frames sub-areas designated for placement of an essentially static logo when broadcasted;

generating from the analysis of the sub-areas static area descriptor information;

deciding for each video data frame whether the video data frame is a separating frame by analyzing for each video data frame a plurality of sub-images, which includes the steps of: detecting a separating block of separating frames and detecting a time distance of the detected separating block to a previous separating block of separating frames;

generating separating block descriptor information; and using the static area descriptor information and the separating block descriptor information to evaluate the descriptor information.

2. The method of claim 1, wherein the step of analyzing the sub-areas comprises a step of analyzing sub-areas located in corner sections of the video data frames.

3. The method of claim 1, wherein the step of analyzing the sub-areas further comprises steps of: generating for each video data frame of the plurality of video data frames values of luminance for each of the sub-areas; storing a plurality of darkest values of luminance for each of the sub-areas; generating for each of the sub-areas an average value of luminance; and generating the static area descriptor information as indicative of the commercial if for at least one of the sub-areas the average value of luminance exceeds a threshold value.

4. The method of claim 1, wherein the method further comprises the steps of: deciding for each video data frame whether the video data frame is a separating frame by analyzing for each video data frame a plurality of sub-images; generating separating block descriptor information; and using the separating block descriptor information in the step of evaluating the descriptor information.

5. The method of claim 1, wherein the descriptor information provided from the plurality of descriptors is evaluated in an entropy based decision process.

6. The method of claim 5, wherein the entropy based decision process uses an ID3 algorithm.

7. A program storage device readable by a machine, tangibly embodying a program of instructions executable by the machine to perform method steps of detecting a commercial in a video data stream by evaluating descriptor information provided from a plurality of descriptors indicative of commercial or non-commercial features, comprising:

detecting a plurality of video data frames in the video data stream;
analyzing for each video data frame of the plurality of video data frames sub-areas designated for placement of an essentially static logo when broadcasted;
generating from the analysis of the sub-areas static area descriptor information;
deciding for each video data frame whether the video data frame is a separating frame by analyzing for each video data frame a plurality of sub-images,
which includes the steps of: detecting a separating block of separating frames and detecting a time distance of the detected separating block to a previous separating block of separating frames;
generating separating block descriptor information; and
using the static area descriptor information and the separating block descriptor information to evaluate the descriptor information.

8. An apparatus for processing a video data stream, said apparatus comprising a processing unit, wherein the processing unit is configured to:
detect a plurality of video data frames in the video data stream;
analyze for each video data frame of the plurality of video data frames sub-areas designated for placement of an essentially static logo when broadcasted;
generate from the analysis of the sub-areas static area descriptor information;
decide for each video data frame whether the video data frame is a separating frame by analyzing for each video data frame a plurality of sub-images,
which includes the steps of: detecting a separating block of separating frames and detecting a time distance of the detected separating block to a previous separating block of separating frames;
generate separating block descriptor information; and
detect a commercial in the video data stream by evaluating descriptor information provided from a plurality of descriptors indicative of commercial or non-commercial features, wherein the processor is configured to use the static area descriptor information and the separating block descriptor information to evaluate the descriptor information.

* * * * *